(12) United States Patent
Sasa et al.

(10) Patent No.: US 6,213,881 B1
(45) Date of Patent: Apr. 10, 2001

(54) DAMPER DEVICE

(75) Inventors: Hirozumi Sasa; Kenji Takahashi, both of Tokyo (JP)

(73) Assignee: Tok Bearing Co., Ltd., Tokyo (JP)

( * ) Notice: Subject to any disclaimer, the term of this patent is extended or adjusted under 35 U.S.C. 154(b) by 0 days.

(21) Appl. No.: 09/212,516

(22) Filed: Dec. 16, 1998

(30) Foreign Application Priority Data

Dec. 16, 1997 (JP) ...................................... 9-363506

(51) Int. Cl.[7] ................ F16D 57/02; F16F 9/14
(52) U.S. Cl. ................ 464/24; 188/296; 188/308; 16/50
(58) Field of Search ................ 464/1, 2, 25, 24, 464/180, 164, 28; 16/54, 50; 188/296, 290, 293, 294, 306, 307, 308

(56) References Cited

U.S. PATENT DOCUMENTS

| | | | |
|---|---|---|---|
| 4,653,141 | * | 3/1987 | Converse ........................... 188/306 |
| 4,825,503 | * | 5/1989 | Shiramasa et al. ................ 16/52 |
| 5,664,286 | * | 9/1997 | Sorimachi ........................... 16/54 |
| 5,720,370 | * | 2/1998 | Takahashi ........................... 188/306 |
| 5,988,329 | * | 11/1999 | Evans, Jr. et al. ................ 188/296 |

FOREIGN PATENT DOCUMENTS

| | | |
|---|---|---|
| 07229531 | 8/1995 | (JP) . |
| 07293624 | 11/1995 | (JP) . |

\* cited by examiner

*Primary Examiner*—Terry Lee Melius
*Assistant Examiner*—Kenneth Thompson

(57) ABSTRACT

A damper device includes a casing, a rotor partly housed in the casing, a viscous fluid filled in the casing around the rotor, and a torque generator for generating a torque during a rotating stroke of the rotor. The torque generator includes a fluid torque adjuster for producing a relatively large torque in at least a terminal range of the rotating strokes in normal and reverse directions of the rotor.

13 Claims, 12 Drawing Sheets

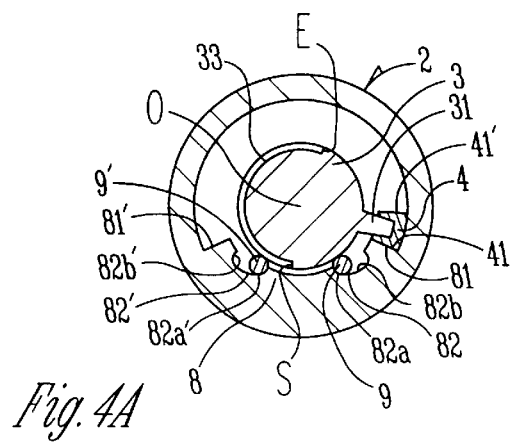
Fig. 4A
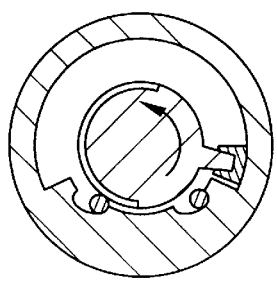
Fig. 4B
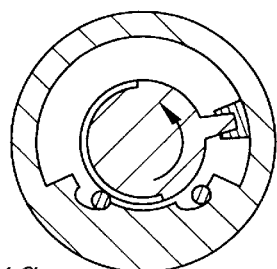
Fig. 4C
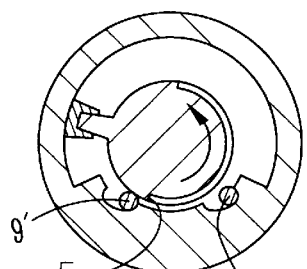
Fig. 4D
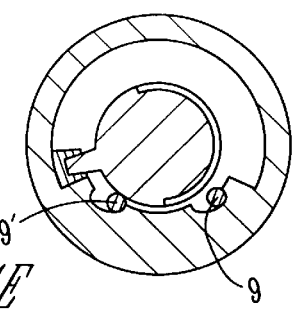
Fig. 4E
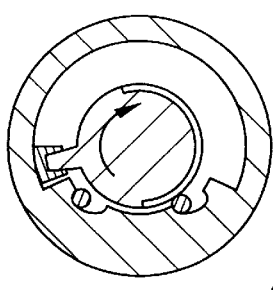
Fig. 4F
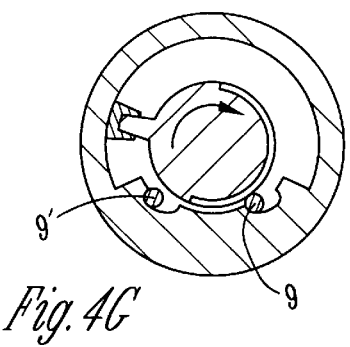
Fig. 4G
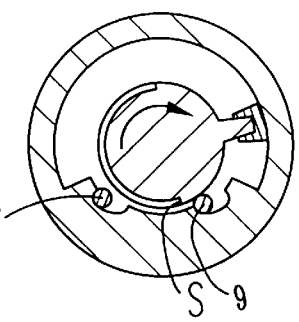
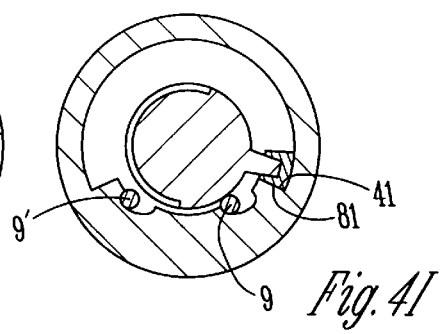
Fig. 4I
Fig. 4H

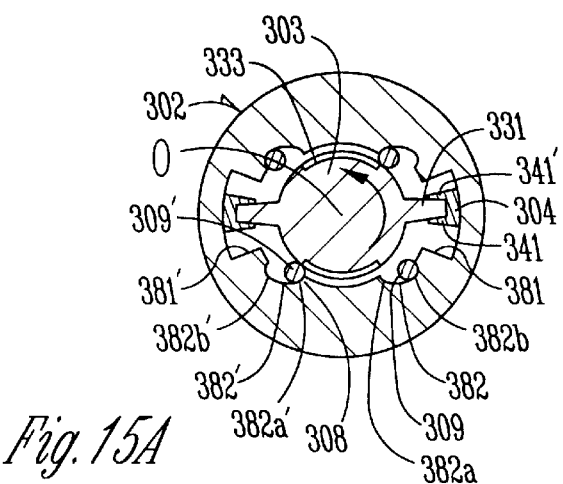
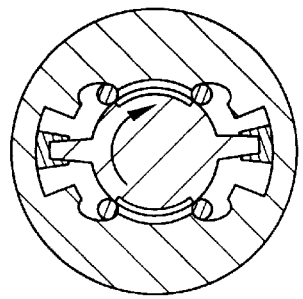
Fig. 15A    Fig. 15B
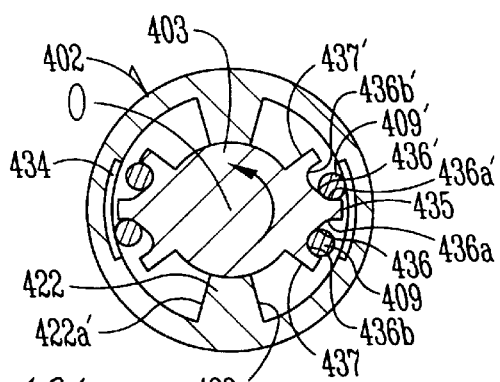
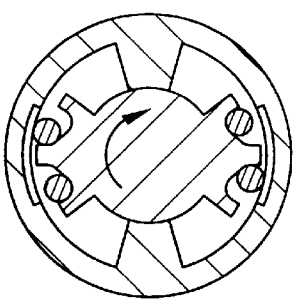
Fig. 16A    Fig. 16B
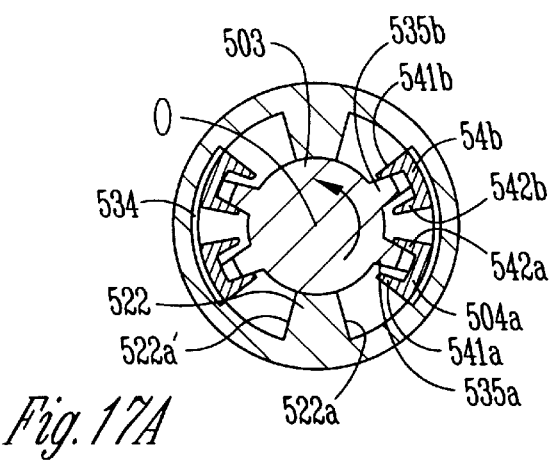
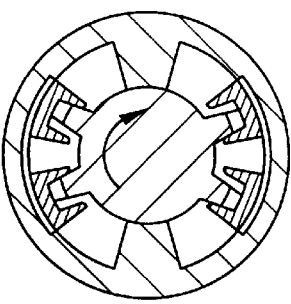
Fig. 17A    Fig. 17B

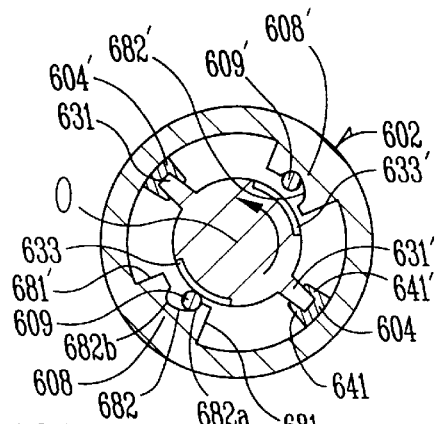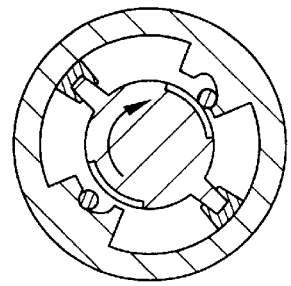
Fig.18A    Fig.18B
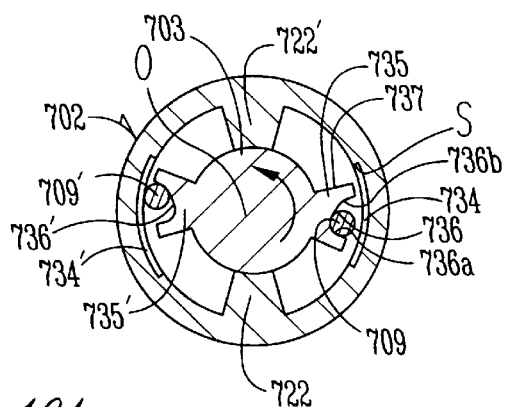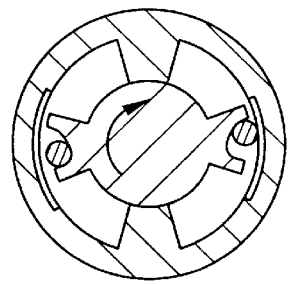
Fig.19A    Fig.19B
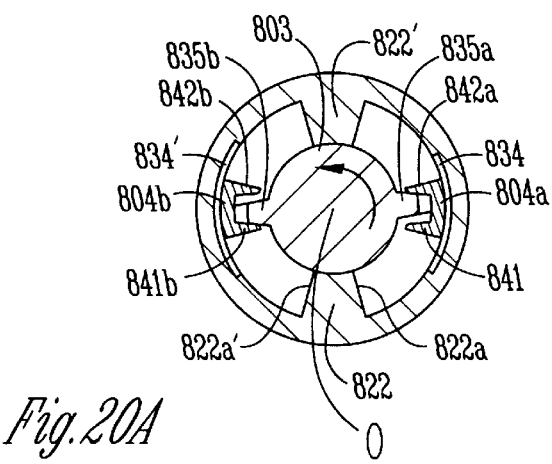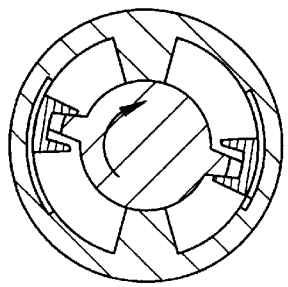
Fig.20A    Fig.20B

DAMPER DEVICE

BACKGROUND OF THE INVENTION

1. Field of the Invention

The present invention relates to a damper device for use on the door of a container to apply damping forces to the angular movement of the door in terminal ranges of opening and closing movements of the door, or for use on an electrically powered tool such as an electrically powered saw or plane to reduce shocks in terminal ranges of reciprocating movements thereof.

2. Description of the Related Art

Heretofore, some containers are equipped with a damper device mounted on the door for preventing the door from banging against the door frame when the door is closed. Since the damper device operates only when the door is closed, however, the damper device is not active when the door is quickly opened. When the door is quickly opened, therefore, the door tends to hit a stop, producing undesirable noise or causing damage to itself or the stop. For producing a damping action in a terminal range of the opening movement of the door, the door needs to incorporate another separate damper device separately from the existing damper device which operates only when the door is closed.

There has not been known any example in which the above damper device is applied to a reciprocally movable electrically powered tool. Heretofore, it has been customary for the user of a reciprocally movable electrically powered tool to empirically control forces produced by the tool in terminal regions of its reciprocating actions to avoid unwanted impacts or damage to the tool. However, controlling forces produced by the tool in terminal regions of its reciprocating actions needs a skilled experience on the part of the user, and is physically fatiguing to the user.

Installing two damper devices on one door is highly costly. In addition, it is a complex task to install two damper devices on one door and also to perform maintenance on the two damper devices mounted on the door. There has been a demand for a single damper device which is capable of producing a damping force in both terminal ranges of opening and closing movements of a door on which the damper device is installed.

SUMMARY OF THE INVENTION

It is therefore an object of the present invention to provide a damper device which is capable of generating a damping force in both terminal ranges of opening and closing movements or reciprocating movements of an apparatus on which the damper device is installed.

To achieve the above object, there is provided a damper device comprising a cylindrical casing, a rotor partly housed in the casing, a viscous fluid filled in the cylindrical casing around the rotor, and torque generating means for generating a torque during a rotating stroke of the rotor, the torque generating means including fluid torque adjusting means for producing a relatively large torque in a terminal range of each of the rotating strokes in normal and reverse directions of the rotor and a relatively small torque in other range of each of the rotating strokes. Therefore, if the damper device is installed on a door, then the damper device can produce a damping force in terminal periods of opening and closing movements of the door, thereby preventing the door from banging against a stopper or a door frame when the door is fully closed or opened. Furthermore, since the damper device generates a relatively small torque in the rotating strokes in the normal and reverse directions, it is possible not to apply a damping force in a period other than the terminal periods of opening and closing movements of the door. As a result, the door can be opened and closed with a small force.

The torque generating means may have a first ridge extending axially on an outer surface of the rotor and having a radially outer surface held in sliding contact with an inner surface of the casing, and the fluid torque adjusting means may comprise a first land extending axially on the inner surface of the casing, a pair of first axial grooves defined axially in a radially inner end of the first land and spaced circumferentially from each other, a pair of first needle valves loosely fitted in the first axial grooves, respectively, for movement in the width direction of the first axial grooves, and a first circumferential groove defined circumferentially on the outer surface of the rotor, the first circumferential groove being positioned out of facing relation to at least one of the first needle valves in the terminal range of each of the rotating strokes. When the at least one of the needle valves is held against the outer surface of the rotor in the terminal range, the one of the first needle valves and the first ridge jointly divide an interior space of the casing into two chambers, for effectively preventing the viscous fluid from moving between the chambers to produce the relatively large torque. The fluid torque adjusting means of the above structure can easily be incorporated in the damper device, and can reliably generate a relatively large torque in the terminal range of each of the rotating strokes.

Alternatively, the torque generating means may have a second land extending axially on an inner surface of the casing and having a radially inner surface held in sliding contact with an outer surface of the rotor, and the fluid torque adjusting means may comprise a third land extending axially on the outer surface of the rotor, a pair of second axial grooves defined axially on a radially outer end of the third land on the rotor and spaced circumferentially from each other, a pair of second needle valves loosely fitted in the second axial grooves, respectively, for movement in the width direction of the second axial grooves, and a second circumferential groove defined circumferentially in the inner surface of the casing, the second cylindrical groove being positioned out of facing relation to at least one of the second needle valves in the terminal range of each of the rotating strokes. When the at least one of the second needle valves is held against the inner surface of the casing in the terminal range, the one of the second needle valves and the second land of the casing jointly divide an interior space of the casing into two chambers for effectively preventing the viscous fluid from moving between the chambers to produce the relatively large torque. The fluid torque adjusting means of the above structure can easily be incorporated in the damper device, and can reliably generate a relatively large torque in the terminal range of each of the rotating strokes.

Further alternatively, the torque generating means may have a fourth land extending axially on an inner surface of the casing and having a radially inner surface held in sliding contact with a outer surface of the rotor, and the fluid torque adjusting means may comprise a pair of second ridges extending axially on the outer surface of the rotor, a pair of valve bodies loosely mounted on the second ridges, respectively, and a third circumferential groove defined circumferentially in the inner surface of the casing, the third cylindrical groove being positioned out of facing relation to at least one of the needle valves in the terminal range of each of the rotating strokes. When the at least one of the valve bodies is held against the inner surface of the casing in the terminal range, the one of the valve bodies and the second ridges jointly divide an interior space of the casing into two chambers for effectively preventing the viscous fluid from moving between the chambers to produce the relatively large torque. The fluid torque adjusting means of the above structure can easily be incorporated in the damper device, and can reliably generate a relatively large torque in the terminal range of each of the rotating strokes.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 4A through 4I are cross-sectional view taking along line IV—IV of FIG. 1, showing the manner in which a fluid torque adjuster operates;

FIGS. 15A and 15B are cross-sectional views of a damper device according to a modification of the first embodiment;

FIGS. 16A and 16B are cross-sectional views of a damper device according to a modification of the second embodiment;

FIGS. 17A and 17B are cross-sectional views of a damper device according to a modification of the third embodiment;

FIGS. 18A and 18B are cross-sectional views of a damper device according to another modification of the first embodiment;

FIGS. 19A and 19B are cross-sectional views of a damper device according to another modification of the second embodiment; and FIGS. 20A and 20B are cross-sectional views of a damper device according to another modification of the third embodiment.

DETAILED DESCRIPTION OF THE PREFERRED EMBODIMENTS

Figure 1:
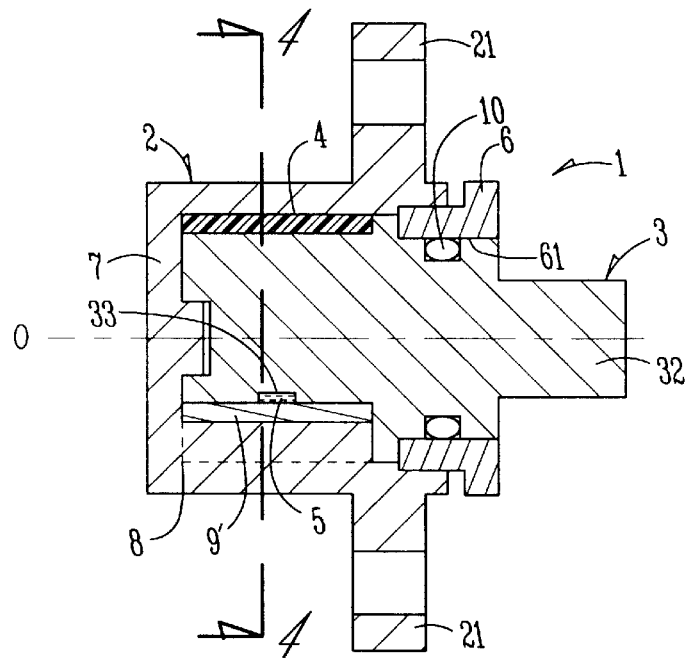
FIG. 1 is a cross-sectional view of a damper device according to a first embodiment of the present invention.

Like or corresponding parts are denoted by like or corresponding reference characters throughout views.

FIG. 1 through FIGS. 4A–4I show a damper device according to a first embodiment of the present invention.

As shown in FIG. 1, the damper device, generally denoted by the reference numeral 1, comprises a cylindrical casing 2, a rotor 3 having a portion rotatably mounted in the 2, and a viscous fluid 5 such as silicone oil filled in the casing 2 around the rotor 3. The casing 2 has a closed end 7 and an opposite open end fitted with an annular cap 6 having an opening 61 through which an axial protrusion 32 of the rotor 3 projects out of the casing 2. A sealing member 10 such as an O-ring is mounted between the rotor 3 and the cap 6 for preventing the viscous fluid 3 from leaking out of the casing 2 along the outer surface of the rotor 3. The casing 2 includes flanges 21 projecting radially outwardly from the open end thereof.

Figure 2:
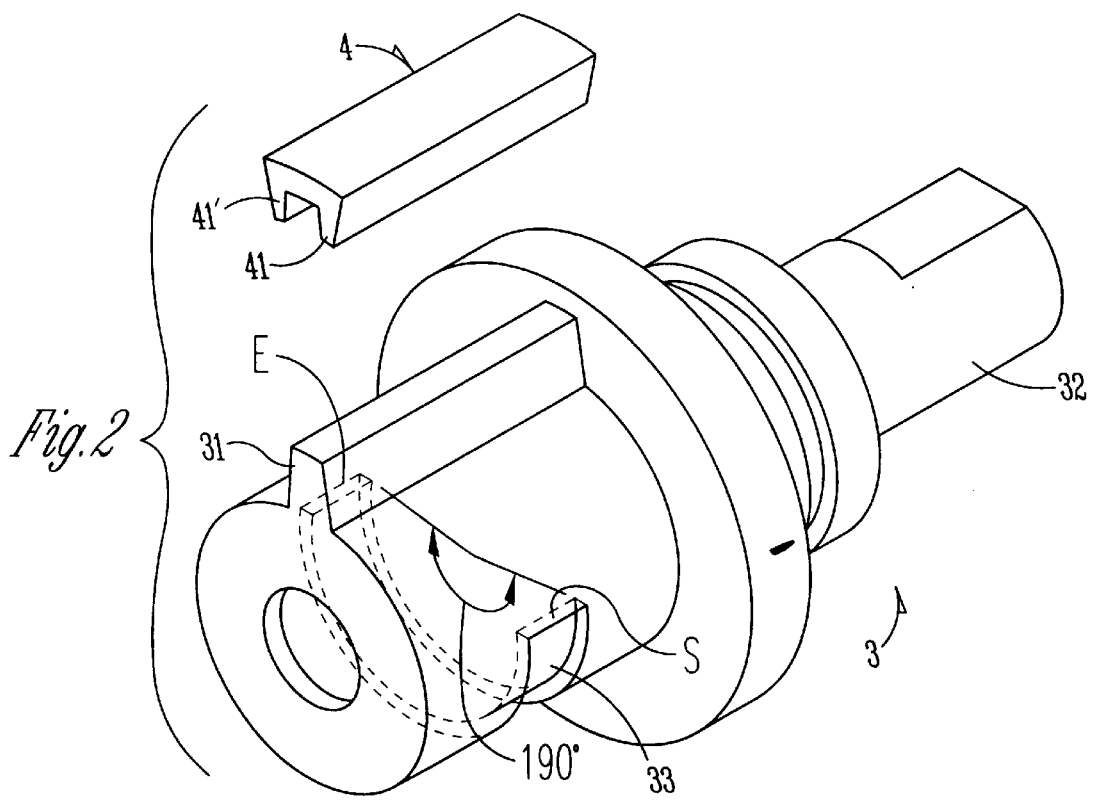
FIG. 2 is an enlarged exploded perspective view of a rotor of the damper device shown in FIG. 1.

As shown in FIG. 2, the rotor 3 has an axial ridge 31 projecting radially outwardly from an outer surface thereof and fitted between circumferentially spaced radial walls 41, 41' of a spacer 4 which is of a substantially U-shaped cross section. The spacer 4 is placed on the radially outer end of the ridge 31 with substantially no play in circumferential and radial directions between the spacer 4 and the ridge 31. Substantially no play between the spacer 4 and the ridge 31 means that the spacer 4 is snugly mounted on the ridge 31 so that the spacer 4 will not wobble on the ridge 31, but the spacer 4 and the ridge 31 are not required to be dimensionally accurate as with precision parts.

When the rotor 3 rotates, the spacer 4 rotates in unison with the ridge 31 with a very small clearance present between the outer circumferential surface of the spacer 4 and the inner surface of the casing 2.

The spacer 4 may be integrally formed with the ridge 31 of the rotor 3.

As shown in FIG. 2, the rotor 3 has a first groove 33 defined in the outer surface thereof at an axially intermediate position, the first groove 33 having a constant width and depth and extending from a starting end S to a terminal end E. The starting end S is spaced circumferentially a given distance from the ridge 31. The groove 33 extends circumferentially from the starting end S away from the ridge 31 to the terminal end E at a position that is diametrically opposite to the starting end S and which is spaced a given distance from the ridge 31. The groove 33 angularly extends about 190° around the central axis O (FIG. 1) of the rotor 3. The width and depth of the groove 33 may be varied circumferentially and/or axially to obtain a desired torque from the damper device 1.

Figure 3:
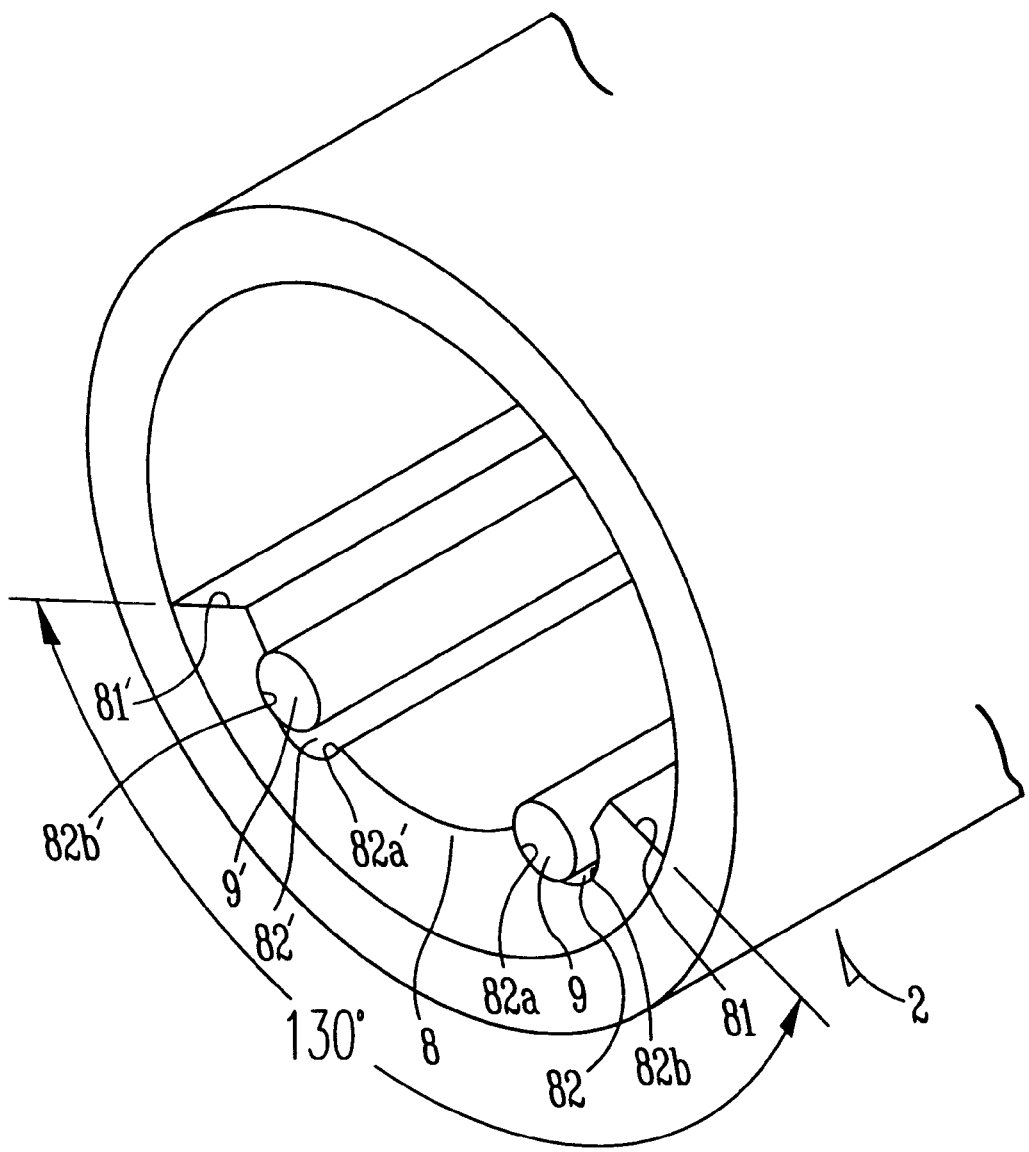
FIG. 3 is an enlarged fragmentary perspective view of a cylindrical casing of the damper device shown in FIG. 1.

As shown in FIG. 3, the cylindrical casing 2 has an axial land 8 projecting radially inwardly from the inner surface thereof and angularly extends about 130° around the central axis O (FIG. 1) of the casing 2 which is aligned with the central axis O of the rotor 3. When the rotor 3 rotates, the spacer 4 also rotates until it abuts against one of circumferentially opposite ends 81, 81' of the land 8, whereupon the rotor 3 is stopped against rotation.

It is more preferable to stop the rotation of the rotor 3 with stoppers positioned outside of the damper device 1 before the spacer 4 abuts against one of circumferentially opposite ends 81, 81' because use of such stoppers is effective in increasing the durability of the spacer 4 and the land 8.

The land 8 has a pair of axial grooves 82, 82', and needle valves 9, 9' having smaller diameters than the widths of the axial grooves 82, 82' are loosely fitted in the axial grooves 82, 82', respectively. The groove 82 has a depth progressively greater circumferentially toward the end 81, and the groove 82' has a depth progressively greater circumferentially toward the end 81'. The needle valves 9, 9' are movable between shallowest groove portions 82a, 82a' of the grooves 82, 82' and deepest groove portions 82b, 82b' of the grooves 82, 82'.

As shown in FIGS. 4B through 4E, when the rotor 3 rotates counterclockwise with respect to the casing 2, the needle valve 9 is positioned in the deepest groove portion 82b, and the needle valve 9' is positioned in the shallowest groove portion 82a'. As shown in FIGS. 4F through 4I, when the rotor 3 rotates clockwise with respect to the casing 2, the needle valve 9 is positioned in the shallowest groove portion 82a, and the needle valve 9' is positioned in the deepest groove portion 82b'.

While the needle valve 9 or 9' is being positioned in the shallowest groove portion 82a or 82a', when the needle valve 9 or 9' face the groove 33 in the rotor 3, a clearance which is as deep as the groove 33 is present between the needle valve 9 or 9' and the rotor 3, and when the needle valve 9 or 9' does not face the groove 33, the needle valve 9 or 9' contact the outer surface of the rotor 3.

While the needle valve 9 or 9' is being positioned in the deepest groove portion 82b or 82b', when the needle valve 9 or 9' face the groove 33 in the rotor 3, a clearance which is deeper than the groove 33 is present between the needle valve 9 or 9' and the rotor 3.

The damper device 1 is installed on a container or the like as follows: The flanges 21 of the casing 2 are fastened to a container body such as a frame for the door of the container. The door is pivotally supported on the container body by a hollow shaft or the like. The protrusion 32 of the rotor 3 is fitted in the hollow shaft and lockingly secured to the hollow shaft, so that the rotor 3 is coupled to the door by the hollow shaft.

Conversely, the flanges 21 may be fastened to the door of the container, and protrusion 32 of the rotor 3 may be fitted in a hollow shaft mounted on a container body such as a frame for the door of the container, and lockingly secured to the hollow shaft, so that the rotor 3 is coupled to the door by the hollow shaft.

According to the first embodiment as described above, a fluid torque adjuster comprises the needle valves 9, 9' disposed axially on the inner surface of the casing 2, and the first groove 33 defined circumferentially in the outer surface of the rotor 3.

Operation of the fluid torque adjuster according to the first embodiment will be described below with reference to FIGS. 4A through 4I. First, an action of the fluid torque adjuster when the door of the container is closed from a fully open, still position will be described below.

When the door of the container with the dapper device 1 mounted thereon is fully open, the parts of the dapper device 1 are in the position shown in FIG. 4A. The wall 41 of the spacer 4 mounted on the ridge 31 is held against the end 81 of the land 8. Since the viscous fluid does not flow at this stage, the needle valves 9, 9' are in a free state in the respective grooves 82, 82'.

When the rotor 3 slightly rotates counterclockwise from the position shown in FIG. 4A, the needle valve 9 moves counterclockwise into the deepest groove portion 82b and the needle valve 9' moves counterclockwise into the shallowest groove portion 82a' as shown in FIG. 4B.

As the rotor 3 rotates from the position shown in FIG. 4B to the position shown in FIG. 4C, the needle valve 9 is positioned in the deepest groove portion 82b though it does not face the groove 33. Therefore, a passage for the viscous fluid 5 is provided between opposite sides of the needle valve 9. Inasmuch as the needle valve 9' faces the groove 33, a passage for the viscous fluid 5 is also provided between opposite sides of the needle valve 9'. Since passages for the viscous fluid 5 are thus provided between opposite sides of the needle valves 9, 9', the fluid torque adjuster generates a relatively small torque.

When the rotor 3 rotates from the position shown in FIG. 4C to the position shown in FIG. 4D, the needle valve 9' positioned in the shallowest groove 82a' passes the terminal end E of the groove 33 and contact the surface of the rotor 3. Therefore, as the passages for the viscous fluid 5 between opposite sides of the needle valve 9' is interrupted, the fluid torque adjuster generates a relatively large torque.

When the rotor 3 further rotates counterclockwise from the position shown in FIG. 4D, the other wall 41' of the spacer 4 abuts against the other end 81' of the land 8 as shown in FIG. 4E, whereupon the rotor 3 is stopped against rotation. While the rotor 3 is rotating from the position shown in FIG. 4D to the position shown in FIG. 4E, the needle valve 9' does not face the groove 33 and is positioned in the shallowest groove portion 82a', and hence is in contact with the outer surface of the rotor 3. Since no passage for the viscous fluid 5 is provided between opposite sides of the needle valve 9', the fluid torque adjuster generates a relatively large torque.

Consequently, when the door of the container is closed from the fully open position, the fluid torque adjuster generates a relatively large torque in a terminal range of the rotating stroke of the rotor 3, and generates a relatively low torque from a starting range of the rotating stroke of the rotor 3 prior to the terminal range of the rotating stroke thereof.

Now, an action of the fluid torque adjuster when the door of the container is opened from a fully closed position will be described below.

When the door of the container with the damper device 1 mounted thereon is fully closed, the parts of the damper device 1 are in the position shown in FIG. 4E.

When the rotor 3 slightly rotates clockwise from the position shown in FIG. 4E, the needle valve 9 moves clockwise from the deepest groove portion 82b into the shallowest groove portion 82a and the needle valve 9' moves clockwise from the shallowest groove portion 82a' into the deepest groove portion 82b' as shown in FIG. 4F.

As the rotor 3 rotates from the position shown in FIG. 4F to the position shown in FIG. 4G, the needle valve 9' is still positioned in the deepest groove portion 82b' while not facing the groove 33, and the needle valve 9 faces the groove 33. Therefore, the passages for the viscous fluid 5 are thus kept between opposite sides of the needle valves 9, 9', and the fluid torque adjuster generates a relatively small torque.

When the rotor 3 rotates from the position shown in FIG. 4G to the position shown in FIG. 4H, the needle valve 9 positioned in the shallowest groove 82a passes the starting end S of the groove 33 and contact the circumferential surface of the rotor 3, while the needle valve 9' faces the groove 33. Therefore, as the passages for the viscous fluid 5 between opposite sides of the needle valves 9 is thus interrupted, the fluid torque adjuster generates a relatively large torque.

As the rotor 3 further rotates from the position shown in FIG. 4H, when the wall 41 of the spacer 4 abuts against the end 81 of the land 8 as shown in FIG. 4I, whereupon the rotor 3 is stopped against rotation.

As the rotor 3 rotates from the position shown in FIG. 4H up to the position shown in FIG. 4I, the needle valve 9' is positioned in the deepest groove portion 82b' while facing the groove 33. Therefore, the clearance is still kept between the needle valve 9' and the rotor 3. However, the needle valve 9 is no longer facing the groove 33 and contacts the outer surface of the rotor 3. Since no passage for the viscous fluid 5 is produced between opposite sides of the needle valve 9, the fluid torque adjuster generates a relatively large torque.

Consequently, when the door of the container is opened from the fully closed position, the fluid torque adjuster generates a relatively large torque in a terminal range of the rotating stroke of the rotor 3, and generates a relatively low torque from a starting range prior to the terminal range of the rotating stroke thereof, as when the door of the container is closed from the fully open position.

A damper device according to a second embodiment of the present invention will be described below with reference to FIGS. 5 through 8A–8I.

Figure 5:
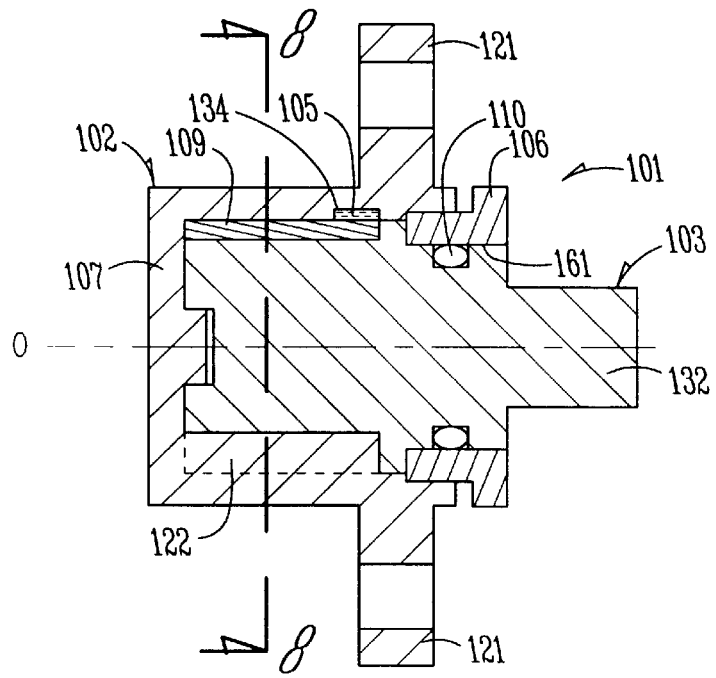
FIG. 5 is a cross-sectional view of a damper device according to a second embodiment of the present invention.

As shown in FIG. 5, the damper device, generally denoted by the reference numeral 101, comprises a cylindrical casing 102, a rotor 103 having a portion rotatably mounted in the casing 102, and a viscous fluid 105 filled in the casing 102 around the rotor 103. An axial protrusion 132 of the rotor 103 projects out of an opening 161 in an annular cap 106 in the open end of the casing 102. A sealing member 110 prevents the viscous fluid 103 from leaking out of the casing 102.

Figure 6:
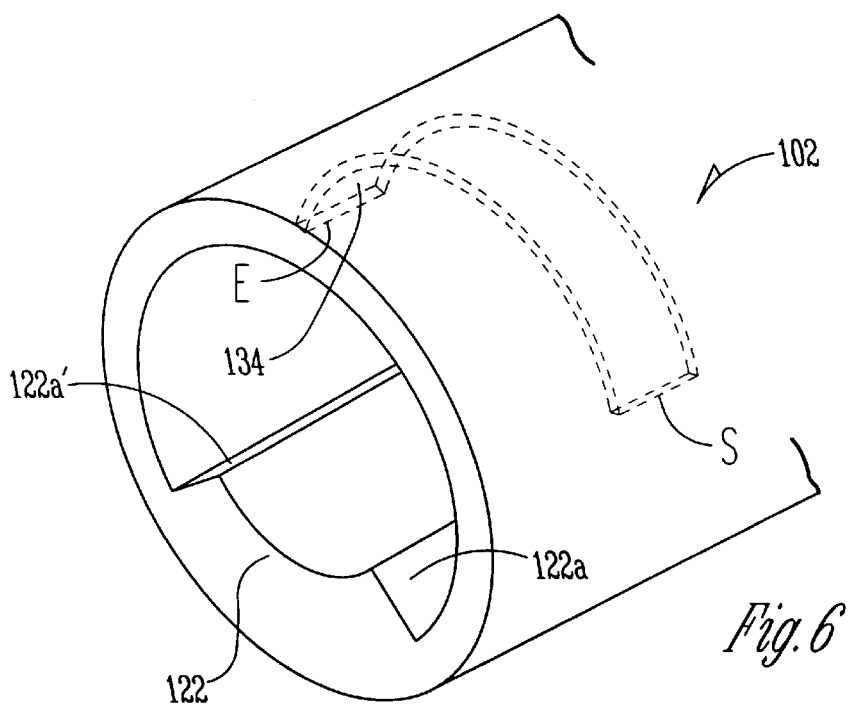
FIG. 6 is an enlarged fragmentary perspective view of a cylindrical casing of the damper device shown in FIG. 5.

As shown in FIG. 6, the casing 102 has a first land 122 projecting radially inwardly from an inner surface thereof. When the rotor 103 rotates, the outer surface of the rotor 103 slides against a radially inner surface of the land 122. When a second land 135 (described later on) of the rotor 103 abuts against one of circumferentially opposite ends 122a, 122a' of the land 122, the rotor 103 is stopped against rotation.

As shown in FIG. 6, the casing 102 has a second groove 134 defined in the inner surface thereof, the second groove 134 having a constant width and depth and extending from a starting end S to a terminal end E. The second groove 134 extends diametrically opposite to the land 122. Specifically, the distance between the starting end S and the end 122a is equal to the distance between the terminal end E and the other end 122a'. Alternatively, the distance between the starting end S and the end 122a may be different from the distance between the terminal end E and the other end 122a'. The groove 134 angularly extends about 140° around the central axis O (FIG. 5) of the casing 102. The width and depth of the groove 134 may be varied circumferentially and/or axially to obtain a desired torque from the damper device 101.

Figure 7:
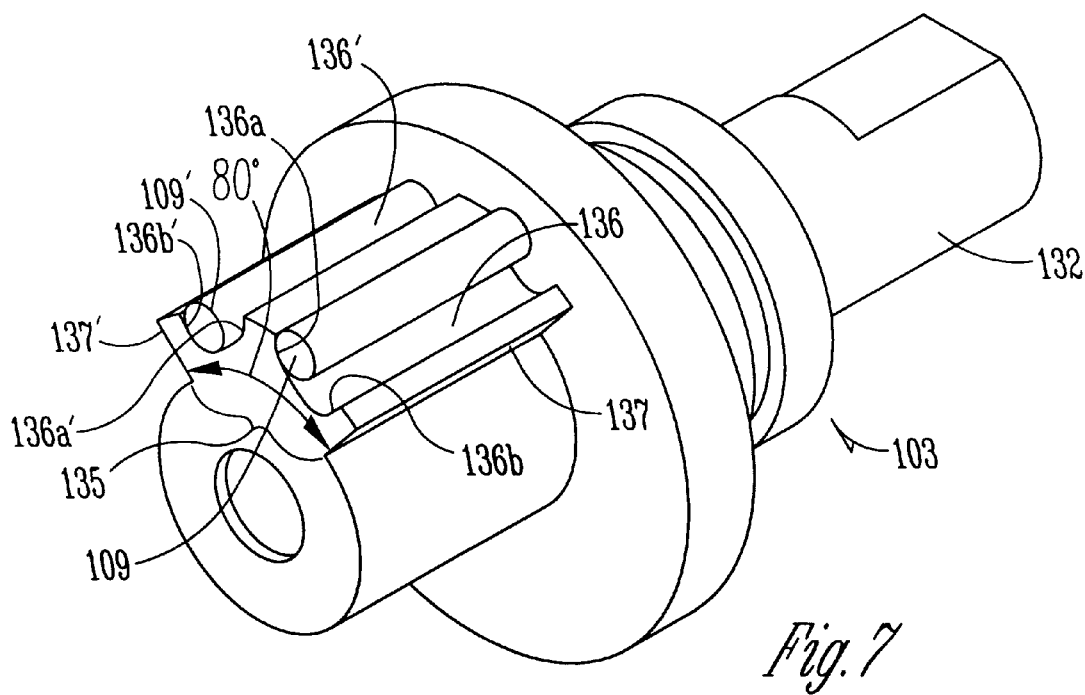
FIG. 7 is an enlarged perspective view of a rotor of the damper device shown in FIG. 5.

As shown in FIG. 7, the rotor 103 has a second land 135 extending axially on the outer surface thereof. The land 135 has a pair of axial grooves 136, 136' defined in an outer surface thereof, and also has a pair of circumferentially opposite ends 137, 137'. The land 135 angularly extends about 80° around the central axis O (FIG. 5) of the rotor 103. Needle valves 109, 109' having smaller diameters than the widths of the axial grooves 136, 136' are loosely fitted in the axial grooves 136, 136', respectively. The groove 136 has a depth progressively greater circumferentially toward the end 137, and the groove 136' has a depth progressively greater circumferentially toward the end 137'. The needle valves 109, 109' are movable between shallowest groove portions 136a, 136a' and deepest groove portions 136b, 136b' of the grooves 136, 136'.

As shown in FIGS. 8B through 8E, when the rotor 103 rotates counterclockwise with respect to the casing 102, the needle valve 109 is positioned in the deepest groove portion 136b, and the needle valve 109' is positioned in the shallowest groove portion 136a'. As shown in FIGS. 8F through 8I, when the rotor 103 rotates clockwise with respect to the casing 102, the needle valve 109 is positioned in the shallowest groove portion 136a, and the needle valve 109' is positioned in the deepest groove portion 136b'.

While the needle valve 109 or 109' is being positioned in the shallowest groove portion 136a or 136a', when the needle valve 109 or 109' face the groove 134 in the casing 102, a clearance which is as deep as the groove 134 is created between the needle valve 109 or 109' and the casing 102, and when the needle valve 109 or 109' does not face the groove 134, the needle valves 109 or 109' contact the inner surface of the casing 102.

While the needle valve 109 or 109' is being positioned in the deepest groove portion 136b or 136b', when the needle valve 109 or 109' faces the groove 134 in the casing 102, a clearance which is deeper than the groove 134 is created between the needle valve 109 or 109' and the casing 102.

According to the second embodiment as described above, a fluid torque adjuster comprises the grooves 136, 136' defined axially in the land 135 on the outer surface of the rotor 103, and the second groove 134 defined circumferentially in the inner surface of the casing 102.

The damper device 101 according to the second embodiment is connected to the door of a container or the like as with the damper device according to the first embodiment.

Operation of the fluid torque adjuster according to the second embodiment will be described below with reference to FIGS. 8A through 8I. First, an action of the fluid torque adjuster when the door of the container is closed from a fully open position will be described below.

Figure 8A:
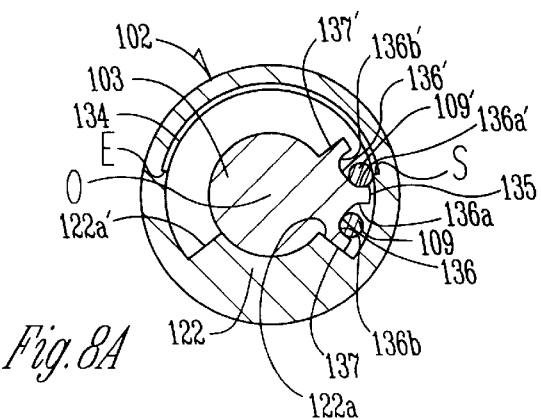
FIGS. 8A through 8I are cross-sectional view taking along line VIII—VIII of FIG. 5, showing the manner in which a fluid torque adjuster operates.

When the door of the container with the damper device 101 mounted thereon is fully open, the parts of the damper device 101 are in the position shown in FIG. 8A. The end 137 of the land 135 is held against the end 122a of the land 122. Since the viscous fluid does not flow at this stage, the needle valves 109, 109' are in a free state in the respective grooves 136, 136'.

Figure 8B:
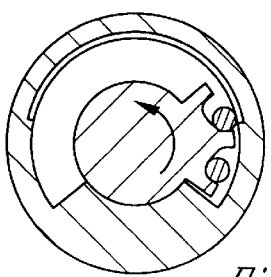

When the rotor 103 slightly rotates counterclockwise from the position shown in FIG. 8A to the position shown in FIG. 8B, the needle valve 109 moves clockwise into the deepest groove portion 136b and the needle valve 109' moves clockwise into the shallowest groove portion 136a'.

Figure 8C:
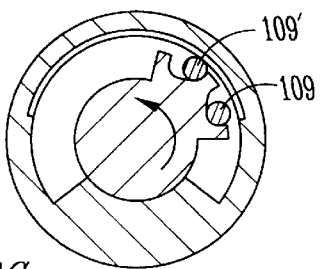

As the rotor 103 rotates from the position shown in FIG. 8B to the position shown in FIG. 8C, the needle valve 109 is positioned in the deepest groove portion 136b though it does not face the groove 134. Therefore, a passage for the viscous fluid 105 is provided between opposite sides of the needle valve 109. Inasmuch as the needle valve 109' faces the groove 134 a passage for the viscous fluid 105 is also provided between opposite sides of the needle valve 109', and as a result, the fluid torque adjuster generates a relatively small torque.

Figure 8D:
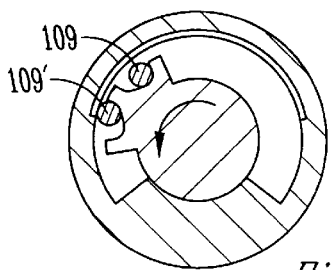

When the rotor 103 rotates from the position shown in FIG. 8C to the position shown in FIG. 8D, the needle valve 109' positioned in the shallowest groove 136a' comes to the terminal end E of the groove 134 and contacts the inner surface of the casing 102 while the needle valve 109 faces the groove 134. Therefore, since the passages for the viscous fluid 105 between opposite sides of the needle valve 109' is thus interrupted, the fluid torque adjuster generates a relatively large torque.

Figure 8E:
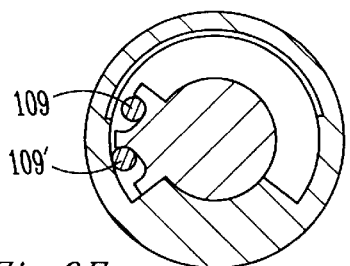

When the rotor 103 further rotates counterclockwise from the position shown in FIG. 8D, the other end 137' of the land 135 abuts against the other end 122a' of the land 122 as shown in FIG. 8E, whereupon the rotor 103 is stop against rotation. While the rotor 103 is rotating from the position shown in FIG. 8D to the position shown in FIG. 8E, the needle valve 109' does no longer face the groove 134 and is positioned in the shallowest groove portion 136a', and hence is in contact with the inner surface of the casing 102. Since no passage for the viscous fluid 105 is provided between opposite sides of the needle valve 109', the fluid torque adjuster generates a relatively large torque.

Consequently, when the door of the container is closed from the fully open position, the fluid torque adjuster generates a relatively large torque in a terminal range of the rotating stroke of the rotor 103, and generates a relatively low torque from a starting range of the rotating stroke of the rotor 103 prior to the terminal range of the rotating stroke thereof.

Now, an action of the fluid torque adjuster when the door of the container is opened from a fully closed position will be described below.

When the door of the container with the damper device 101 mounted thereon is fully closed, the parts of the dapper device 101 are in the position shown in FIG. 8E.

Figure 8F:
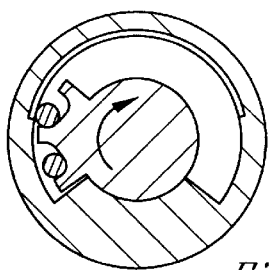

When the rotor 103 slightly rotates clockwise from the position shown in FIG. 8E, the needle valve 109 moves counterclockwise from the deepest groove portion 136b into the shallowest groove portion 136a and the needle valve 109' moves counterclockwise from the shallowest groove portion 136a' into the deepest groove portion 136b' as shown in FIG. 8F.

Figure 8G:
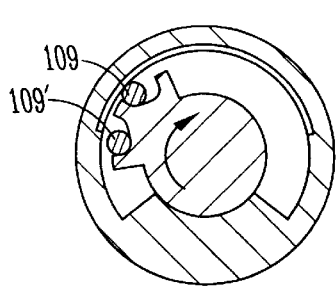

As the rotor 103 rotates from the position shown in FIG. 8F to the position shown in FIG. 8G, the needle valve 109' is still positioned in the deepest groove portion 136b' while not facing the groove 134, and the needle valve 109 faces the groove 134. Therefore, the passages for the viscous fluid 105 are thus kept between opposite sides of the needle valves 109, 109', the fluid torque adjuster generates a relatively small torque.

Figure 8H:
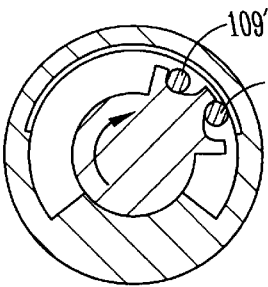

When the rotor 103 rotates from the position shown in FIG. 8G to the position shown in FIG. 8H, the needle valve 109 positioned in the shallowest groove 136a comes to the starting end S of the groove 134 and contacts the inner surface of the casing 102 while the needle valve 109' faces the groove 134. Therefore, as the passages for the viscous fluid 105 between opposite sides of the needle valve 109 is thus interrupted, the fluid torque adjuster generates a relatively large torque.

Figure 8I:
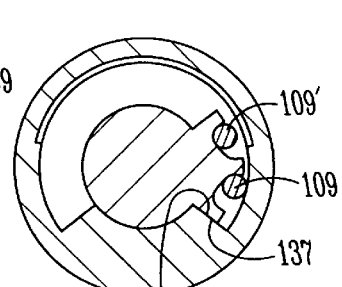

As the rotor 103 further rotates from the position shown in FIG. 8H, when the end 137 of the land 135 abuts against the end 122a of the land 122 as shown in FIG. 8I, whereupon the rotor 103 is stopped against rotation. In the position shown in FIG. 8I, the needle valves 109, 109' are in the initial free state as shown in FIG. 8A.

As the rotor 103 rotates from the position shown in FIG. 8H up to the position shown in FIG. 8I, the needle valve 109' is positioned in the deepest groove portion 136b' while facing the groove 134. Therefore, the clearance is still kept between the needle valve 109' and the casing 102. However, the needle valve 109 positioned in the shallowest groove portion 136a is no longer facing the groove 134 and contacts the inner surface of the casing 102. Since no passage for the viscous fluid 105 is provided between opposite sides of the needle valve 109, the fluid torque adjuster continues to generate a relatively large torque.

Consequently, according to the second embodiment, as with the first embodiment, when the door of the container is opened from the fully closed position, the fluid torque adjuster generates a relatively large torque in a terminal range of the rotating stroke of the rotor 103, and generates a relatively low torque from a starting range prior to the terminal range of the rotating stroke thereof, as when the door of the container is closed from the fully open position.

A damper device according to a third embodiment of the present invention will be described below with reference to FIG. 9 through 12A–12I.

Figure 9:
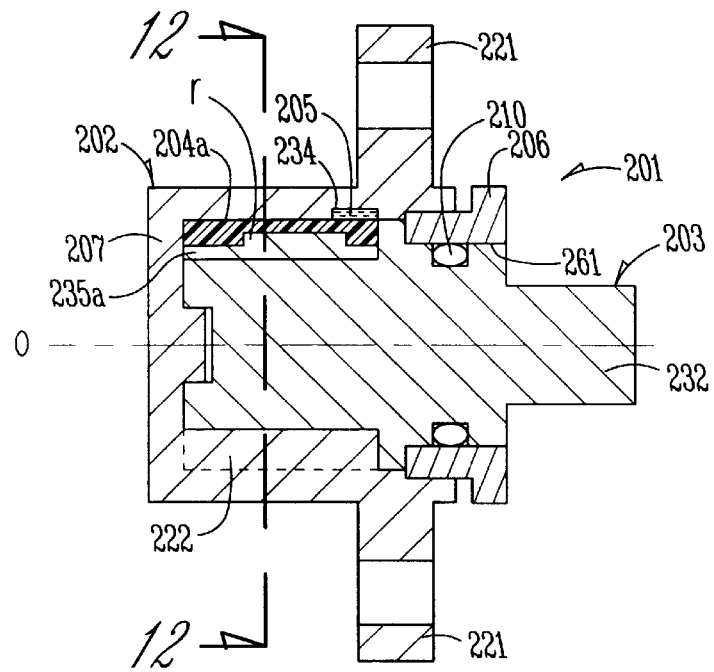
FIG. 9 is a cross-sectional view of a damper device according to a third embodiment of the present invention.

As shown in FIG. 9, the dapper device, generally denoted by the reference numeral 201, comprises a cylindrical casing 202, a rotor 203 having a portion rotatably mounted in the casing 202, and a viscous fluid 205 filled in the casing 202 around the rotor 203. An axial protrusion 232 of the rotor 203 projects out of an opening 261 in an annular cap 206 in the open end of the casing 202. A sealing member 210 prevents the viscous fluid 203 from leaking out of the casing 202.

Figure 10:
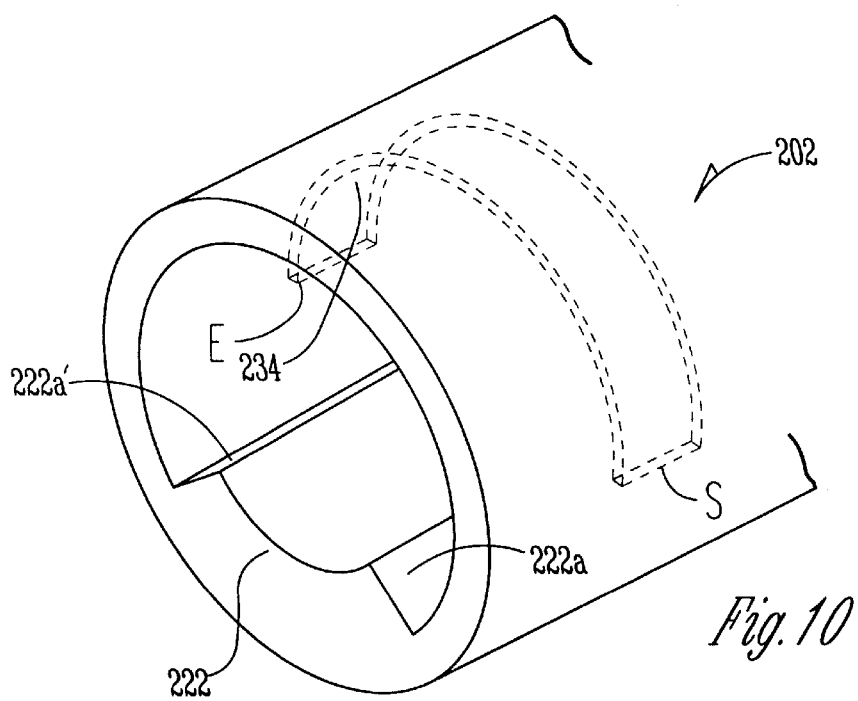
FIG. 10 is an enlarged fragmentary perspective view of a cylindrical casing of the damper device shown in FIG. 9.

As shown in FIG. 10, the casing 202 has a land 222 projecting radially inwardly from an inner surface thereof. When the rotor 203 rotates, the outer surface of the rotor 203 slides against a radially inner surface of the land 222. When the rotor 203 rotates clockwise in FIGS. 12F–12H, an end 241a of a valve body 204a abuts against an end 222a of the land 222, whereupon the rotor 203 is stopped against rotation. When the rotor 203 rotates counterclockwise in FIGS. 12B–12D, an end 241b of a valve body 204b abuts against an opposite end 222a' of the land 222, whereupon the rotor 203 is stopped against rotation.

As shown in FIG. 10, the casing 202 has a third groove 234 defined in the inner surface thereof, the third groove 234 having a constant width and depth and extending from a starting end S to a terminal end E. The third groove 234 extends diametrically opposite to the land 222. Specifically, the distance between the starting end S and the end 222a is equal to the distance between the terminal end E and the other end 222a'. Alternatively, the distance between the starting end S and the end 222a may be different from the distance between the terminal end E and the other end 222a'. The groove 234 angularly extends about 190° around the central axis O of the casing 202. The width and depth of the groove 234 may be varied circumferentially and/or axially to obtain a desired torque from the damper device 201.

Figure 11:
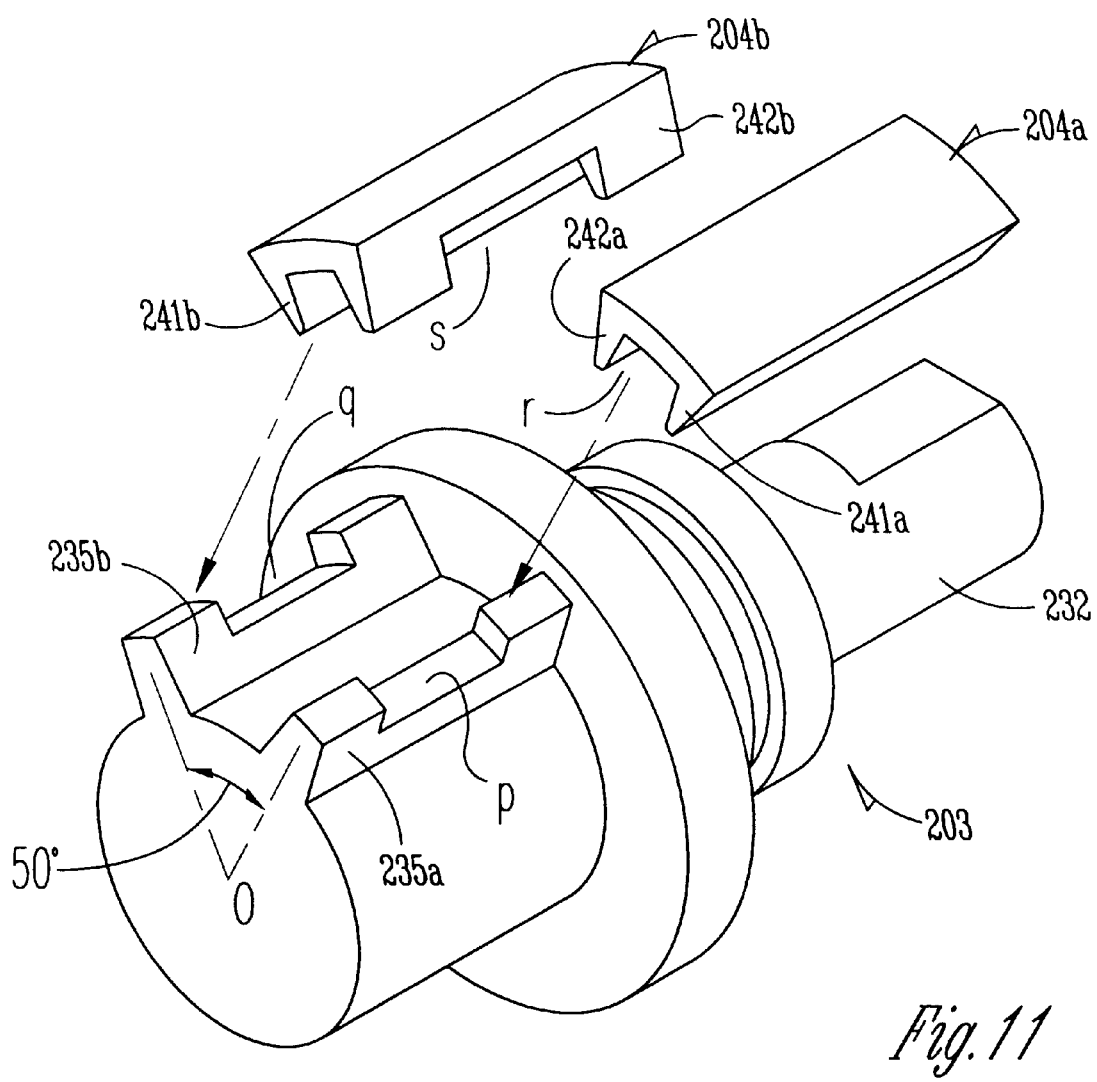
FIG. 11 is an enlarged exploded perspective view of a rotor of the damper device shown in FIG. 9.

As shown in FIG. 11, the rotor 203 has a pair of circumferentially spaced axial ridges 235a, 235b projecting radially outwardly from an outer surface thereof and having respective recesses p, q defined axially centrally in radially outer ends thereof. The ridges 235a, 235b extend respectively along planes angularly spaced about 50° from each other about the central axis O of the rotor 203.

Valve bodies 204a, 204b, each of a substantially U-shaped cross section, are loosely fitted over the respective ridges 235a, 235b for rotation with the ridges 235a, 235b upon rotation of the rotor 203. The valve body 204a has a pair of circumferentially spaced radial walls 241a, 242a, and the valve body 204b has a pair of circumferentially spaced radial walls 241b, 242b. The circumferential distance between the walls 241a, 242a and the circumferential distance between the walls 241b, 242b are greater than the circumferential widths of the ridges 235a, 235b. Therefore, the ridges 235a, 235b can move between the walls 241a, 242a and between the walls 241b, 242b.

The walls 242a, 242b which are positioned adjacent to each other have respective recesses r, s defined axially centrally therein. The walls 241a, 241b have no such recesses.

As shown in FIGS. 12B through 12E, when the rotor 203 rotates counterclockwise with respect to the casing 202, the ridge 235a rotates with its forward face held against the wall 242a of the valve body 204a, and the ridge 235b rotates with its forward face held against the wall 241b of the valve body 204b. As shown in FIGS. 12F through 12I, when the rotor 203 rotates clockwise with respect to the casing 202, the ridge 235a rotates with its forward face held against the wall 241a of the valve body 204a, and the ridge 235b rotates with its forward face held against the wall 242b of the valve body 204b.

According to the third embodiment, a fluid torque adjuster comprises the valve bodies 204a, 204b loosely fitted over the respective ridges 235a, 235b, and the third groove 234 defined circumferentially in the inner surface of the casing 202. The valve bodies 204a, 204b include the radial walls 242a, 242b, respectively, each having a recess and the radial walls 241a, 241b, respectively, each having no recess.

The damper device 201 according to the third embodiment is connected to the door of a container or the like as with the damper devices according to the first and second embodiments.

Operation of the fluid torque adjuster according to the third embodiment will be described below with reference to FIGS. 12A through 12I. First, an action of the fluid torque adjuster when the door of the container is closed from a fully open position will be described below.

Figure 12A:
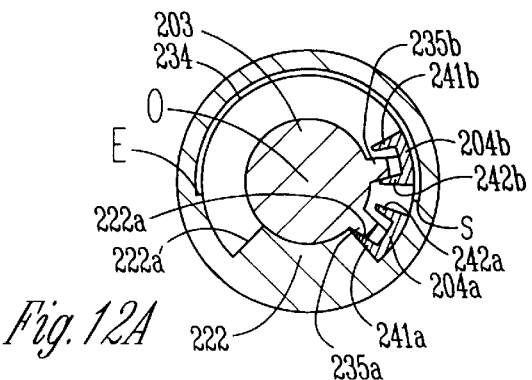
FIGS. 12A through 12I are cross-sectional view taking along line XII—XII of FIG. 9, showing the manner in which a fluid torque adjuster operates.

When the door of the container with the damper device 201 mounted thereon is fully open, the parts of the damper device 201 are in the position shown in FIG. 12A. The wall 241a of the valve body 204a has an inner surface held against the lower surface, as shown in FIG. 12A, of the ridge 235a, and an outer surface held against the end 222a of the land 222. The radially outer surface of the valve body 204a is held against the inner surface of the casing 202. The wall 242b of the valve body 204b has an inner surface held against the lower surface, as shown in FIG. 12A, of the ridge 235b. The radially outer surface of the valve body 204b faces the groove 234. A clearance which is as deep as the groove 234 is present between the radially outer surface of the valve body 204b and the inner surface of the casing 202.

Figure 12B:
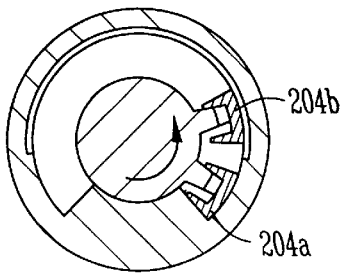

When the rotor 203 slightly rotates counterclockwise from the position shown in FIG. 12A to the position shown in FIG. 12B, the valve bodies 204a, 204b do not rotate until the inner surface of the wall 242a of the valve body 204a is brought into contact with the upper surface, as shown in FIG. 12B, of the ridge 235a, and the inner surface of the wall 241b of the valve body 204b is brought into contact with the upper surface, as shown in FIG. 12B, of the ridge 235b.

In the position shown in FIG. 12B, as with the position shown in FIG. 12A, the radially outer surface of the valve body 204a is held against the inner surface of the casing 202, and the radially outer surface of the valve body 204b in its entirety faces the groove 234 while the wall 242b having the recess r being held against the forward face of the ridge 235a. Therefore, a passage for the viscous fluid is provided between the radially outer surface of the valve body 204b and the inner surface of the casing 202, and through the recesses r, p of the wall 242a and the ridge 235a, respectively.

Figure 12C:
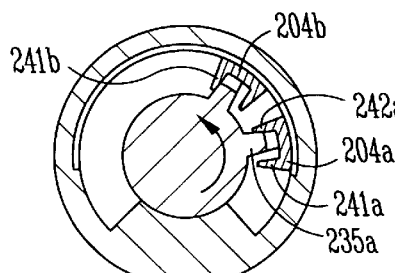

As the rotor 203 rotates from the position shown in FIG. 12B to the position shown in FIG. 12C, a passage for the viscous fluid 205 extends from the groove 234 which faces the valve body 204b, through the recess r in the wall 242a and through the recess p in the ridge 235a, to a space between the inner surface of the wall 241a and one side surface of the ridge 235a. As a result, the fluid torque adjuster produces a relatively small torque.

Figure 12D:
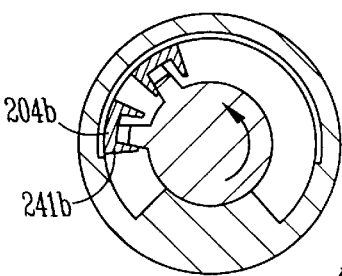

When the rotor 203 rotates from the position shown in FIG. 12C to the position shown in FIG. 12D, the wall 241b of the valve body 204b comes to the terminal end E of the groove 234 and a front end of the radially outer surface of the valve body 204b contacts the inner surface of the casing 202 which has no groove. As a result, a fluid communication through the groove 234 is interrupted at the terminal end E of the groove 234. Since no recess is defined in the wall 241b of the valve body 204b, no fluid communication is established between the wall 241a of the valve body 204a and the wall 241b of the valve body 204b. Therefore, the fluid torque adjuster now produces a relatively large torque.

Figure 12E:
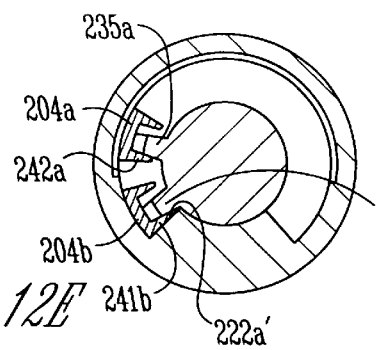

When the rotor 203 further rotates from the position shown in FIG. 12D, the outer surface of the wall 241b of the valve body 204b abuts against the other end 222a' of the land 222, as shown in FIG. 12E, whereupon the rotor 203 is stopped against rotation. During the rotation of the rotor 203 from the position shown in FIG. 12D to the position shown in FIG. 12E, as the radially outer surface of the valve body 204b is held against the inner surface of the casing 202, the fluid torque adjuster continues to produce a relatively large torque.

Consequently, according to the third embodiment, as with the first embodiment, when the door of the container is closed from the fully open position, the fluid torque adjuster generates a relatively large torque in a terminal range of the rotating stroke of the rotor 203, and generates a relatively low torque from a starting range of the rotating stroke of the rotor 203 prior to the terminal range of the rotating stroke thereof.

Now, an action of the fluid torque adjuster when the door of the container is opened from a fully closed position will be described below.

When the door of the container with the damper device 201 mounted thereon is fully closed, the parts of the damper device 201 are in the position shown in FIG. 12E. The wall 241b of the valve body 204b has an inner surface held against the lower surface, as shown in FIG. 12E, of the ridge 235b, and an outer surface held against the end 222a' of the land 222. The radially outer surface of the valve body 204b is held against the inner surface of the casing 202. The wall 242a of the valve body 204a has an inner surface held against the lower surface, as shown in FIG. 12E, of the ridge 235a. The radially outer surface of the valve body 204a faces the groove 234.

Figure 12F:
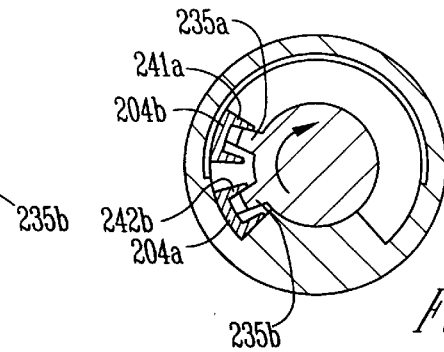

When the rotor 203 slightly rotates clockwise from the position shown in FIG. 12E to the position shown in FIG. 12F, the valve bodies 204a, 204b do not rotate until the inner surface of the wall 242b of the valve body 204b is brought into contact with the upper surface, as shown in FIG. 12F, of the ridge 235b, and the inner surface of the wall 241a of the valve body 204a is brought into contact with the upper surface, as shown in FIG. 12F, of the ridge 235a.

In the position shown in FIG. 12F, as with the position shown in FIG. 12E, the radially outer surface of the valve body 204b is held against the inner surface of the casing 202, and the radially outer surface of the valve body 204a faces the groove 234. Therefore, a clearance which is as deep as the groove 234 is provided between the radially outer surface of the valve body 204a and the inner surface of the casing 202.

Figure 12G:
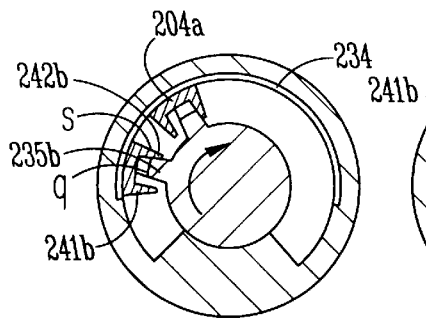

As the rotor 203 rotates from the position shown in FIG. 12F to the position shown in FIG. 12G, a passage for the viscous fluid 205 extends from the groove 234 which faces the valve body 204a, through the recess s in the wall 242b and through the recess q in the ridge 235b, to a space between the inner surface of the wall 241b and one side surface of the ridge 235b. As a result, the fluid torque adjuster produces a relatively small torque.

Figure 12H:
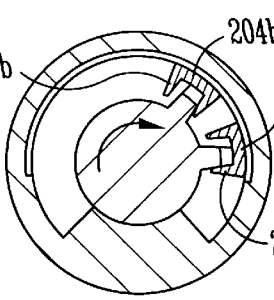

When the rotor 203 rotates from the position shown in FIG. 12G to the position shown in FIG. 12H, the wall 241a of the valve body 204a reaches the starting end S of the groove 234, and a front end of the radially outer surface of the valve body 204a contacts the inner surface of the casing 202 which has no groove. As a result, a fluid communication through the groove 234 is interrupted at the starting end S of the groove 234. Since no recess is defined in the wall 241a of the valve body 204a, no fluid communication is established between the wall 241a of the valve body 204a and the wall 241b of the valve body 204b. Therefore, the fluid torque adjuster now produces a relatively large torque.

Figure 12I:
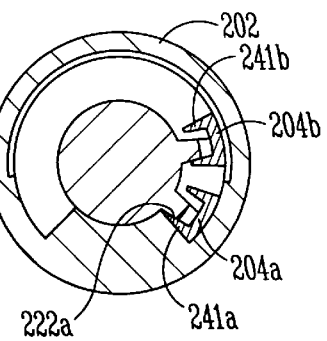

When the rotor 203 further rotates from the position shown in FIG. 12H, the outer surface of the wall 241a of the valve body 204a abuts against the end 222a of the land 222, as shown in FIG. 12I, whereupon the rotor 203 is stopped against rotation. During the rotation of the rotor 203 from the position shown in FIG. 12H to the position shown in FIG. 12I, as the radially outer surface of the valve body 204a is held against the inner surface of the casing 202, the fluid torque adjuster continues to produce a relatively large torque.

Consequently, according to the third embodiment, as with the first and second embodiments, when the door of the container is closed from the fully open position, the fluid torque adjuster generates a relatively large torque in a terminal range of the rotating stroke of the rotor 203, and generates a relatively low torque from a starting range of the rotating stroke of the rotor 203 prior to the terminal range of the rotating stroke thereof.

Figure 13:
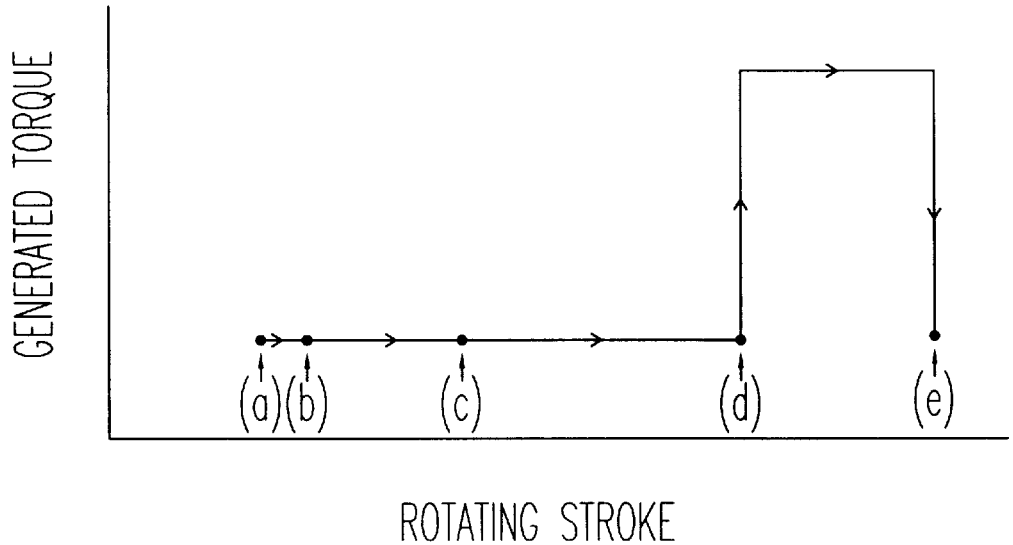
FIG. 13 is a graph showing how a torque is generated when the rotor rotates in a normal direction.
Figure 14:
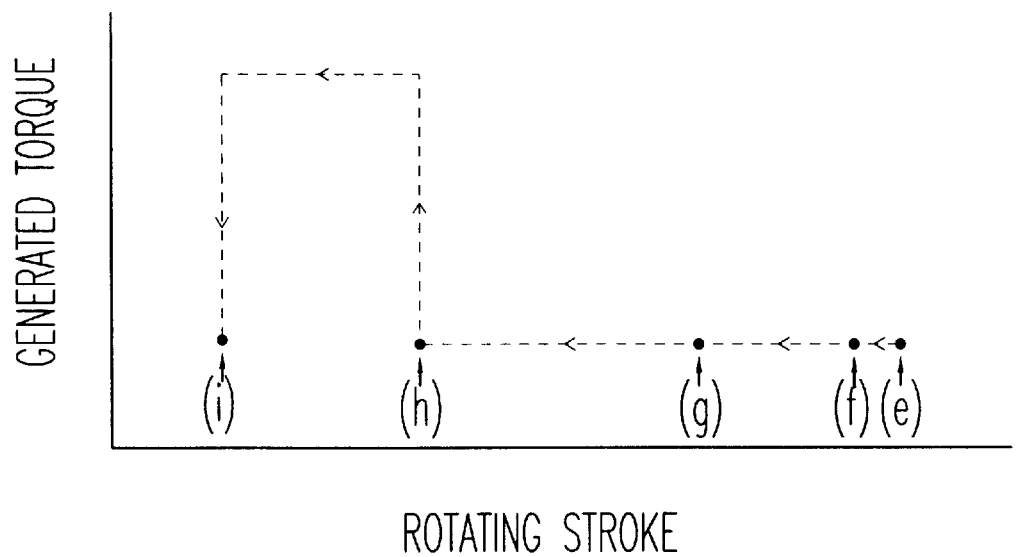
FIG. 14 is a graph showing how a torque is generated when the rotor rotates in a reverse direction.

FIGS. 13 and 14 show how a torque is generated in the rotating strokes of the rotor 3 (103, 203), in normal and reverse directions. FIG. 13 shows a generated torque when the rotor 3 (103, 203) rotates in a counterclockwise stroke in FIGS. 4A–4E, 8A–8E, and 12A–12E, and FIG. 14 shows a generated torque when the rotor 3 (103, 203) rotates in a clockwise stroke in FIGS. 4E–4I, 8E–8I, and 12E–12I. It can be seen from FIGS. 13 and 14 that a higher torque is generated in the terminal range of each of the counterclockwise and clockwise strokes of the rotor 3 (103, 203).

Various modifications of the first through third embodiments will be described below.

FIGS. 15A and 15B show a modification of the first embodiment. As shown in FIGS. 15A and 15B, two spacers 304 are mounted respectively on diametrically opposite ridges 331 on the rotor 303, and two diametrically opposite pairs of needle valves 309, 309' are disposed axially on the inner surface of the cylindrical casing 302. Two first grooves 333 are defined in diametrically opposite relation in the outer surface of the rotor 303. Therefore, the various parts are provided in two sets.

FIGS. 16A and 16B show a modification of the second embodiment. As shown in FIGS. 16A and 16B, two diametrically opposite axial lands 422 project radially inwardly from the inner surface of the cylindrical casing 402, and two diametrically opposite pairs of needle valves 409, 409' are loosely fitted in respective grooves defined in lands 435 of the rotor 403. Two grooves 434 are defined in diametrically opposite relation in the inner surface of the casing 402. Therefore, the various parts are provided in two sets.

FIGS. 17A and 17B show a modification of the third embodiment. As shown in FIGS. 17A and 17B, two diametrically opposite axial lands 522 project radially inwardly from the inner surface of the cylindrical casing 502, and two diametrically opposite pairs of valve bodies 404a, 404b are circumferentially loosely fitted over respective ridges 435a, 435b of the rotor 403. Two grooves 434 are defined in diametrically opposite relation in the inner surface of the casing 402. Therefore, the various parts are provided in two sets.

FIGS. 15A, 16A, and 17A show the positions of the parts when the rotors 303, 403, 503 rotate counterclockwise, and FIGS. 15B, 16B, and 17B show the positions of the parts when the rotors 303, 403, 503 rotate clockwise.

Fluid torque adjusters according to these modifications operate in the same manner as with the fluid torque adjusters where the parts are provided in one set. The parts of the modified fluid torque adjusters may be dimensioned and positioned differently from those illustrated. While the parts are provided in two sets according to the modifications shown in FIGS. 15A, 15B, 16A, 16B, and 17A, 17B, the parts may be provided in three or more sets.

Other modifications of the first through third embodiments will be described below.

FIGS. 18A and 18B show another modification of the first embodiment. As shown in FIGS. 18A and 18B, a pair of diametrically opposite axial lands 608, 608' is disposed on the inner surface of the cylindrical casing 602, and radially movable needle valves 609, 609' are loosely fitted in respective grooves 682, 682' defined axially in the lands 608, 608'. A pair of diametrically opposite ridges 631, 631' is disposed on the outer surface of the rotor 603, and spacers 604, 604' are mounted on the respective ridges 631, 631'. Two grooves 633, 633' are defined in diametrically opposite relation in the outer surface of the rotor 603. In the modification shown in FIGS. 18A and 18B, the various parts are provided in two sets. However, the grooves 682, 682' and the needle valves 609, 609' loosely fitted therein are provided one in each set.

FIGS. 19A and 19B show another modification of the second embodiment. As shown in FIGS. 19A and 19B, a pair of diametrically opposite first axial lands 722, 722' is disposed on the inner surface of the cylindrical casing 702, and a pair of diametrically opposite second axial lands 735, 735' is disposed on the outer surface of the rotor 703. Radially movable needle valves 709, 709' are loosely fitted in respective grooves 736, 736' defined axially in the second lands 735, 735'. Two grooves 734, 734' are defined in diametrically opposite relation in the inner surface of the casing 702. In the modification shown in FIGS. 19A and 19B, the various parts are provided in two sets. However, the grooves 736, 736' and the needle valves 709, 709' loosely fitted therein are provided one in each set.

FIGS. 20A and 20B show another modification of the third embodiment. As shown in FIGS. 20A and 20B, a pair of diametrically opposite first axial lands 822, 822' is disposed on the inner surface of the cylindrical casing 802, and a pair of diametrically opposite axial ridges 835a, 835b is disposed on the outer surface of the rotor 803. Valve bodies 804, 804' are loosely mounted on the respective ridges 835a, 835b, and two grooves 834, 834' are defined in diametrically opposite relation in the inner surface of the casing 802. In the modification shown in FIGS. 20A and 20B, the various parts are provided in two sets. However, the ridges 835a, 835b and the valve bodies 804a, 804b mounted thereon are provided one in each set.

FIGS. 18A, 19A, and 20A show the positions of the parts when the rotors 603, 703, 803 rotate counterclockwise, and FIGS. 18B, 18B, and 20B show the positions of the parts when the rotors 603, 703, 803 rotate clockwise.

Fluid torque adjusters according to these modifications operate in the same manner as with the fluid torque adjusters where the parts are provided in one set. The parts of the modified fluid torque adjusters may be dimensioned and positioned differently from those illustrated. While the parts are provided in two sets according to the modifications shown in FIGS. 18A, 18B, 19A, 19B, and 20A, 20B, the parts may be provided in three or more sets.

The damper device according to the present invention has been described as being applied to the door of a container for damping the door in terminal ranges of opening and closing movements of the door. However, the damper device may be used in other applications. For example, the damper device may be used in combination with reciprocally movable devices for applying damping forces to back-and-forth movements thereof in terminal ranges.

One of the other applications is as an electrically powered saw. Specifically, when the electrically powered saw is pushed to cut a piece of wood, the damper device applies damping forces to the saw in a terminal range of its stroke before the saw hits a rear stop, and when the electrically powered saw is pulled, the damper device also applies damping forces to the saw in a terminal range of its stroke before the saw hits a front stop.

In each of the above embodiments and modifications, the casing is fixed in position and the rotor is rotatable. However, the rotor may be fixed in position and the casing may be rotatable.

Although certain preferred embodiments of the present invention have been shown and described in detail, it should be understood that various changes and modifications may be made therein without departing from the scope of the appended claims.

What is claimed is:

1. A damper device comprising:
   a cylindrical casing;
   a rotor partly housed in said casing;
   a viscous fluid filled in the said casing around said rotor; and
   torque generating means for generating a torque during a rotating stroke of said rotor;
   wherein said torque generating means includes fluid torque adjusting means for producing a relatively large torque in at least a terminal range of each rotating strokes in normal and reverse directions of said rotor and relatively small torque in other range of each of the rotating strokes and
   said fluid torque adjusting means includes a circumferential groove defined circumferentially on one of an outer surface of said rotor and an inner surface of said casing, a land or ridge formed on the other of the outer surface of said rotor and the inner surface of said casing and valves disposed on said land or ridge and closing a space formed between an outer surface of said valve and the outer surface of said rotor or the inner surface of said casing on which said circumferential groove is circumferentially defined during each of rotating strokes of said rotor.

2. A damper device according to claim 1, wherein said torque generating means has a first ridge extending axially on an outer surface of said rotor and having a radially outer surface held in sliding contact with an inner surface of said casing, and wherein said fluid torque adjusting means comprises a first land extending axially on said inner surface of said casing, a pair of first axial grooves defined axially in a radially inner end of said first land and spaced circumferentially from each other, a pair of first needle valves loosely fitted in said first axial grooves, respectively, for movement in the width direction of said first axial grooves, and a first circumferential groove defined circumferentially on said outer surface of said rotor, said first circumferential groove being positioned out of facing relation to at least one of said first needle valves in said terminal range of each of said rotating strokes, whereby when said at least one of the first needle valves is held against said outer surface of said rotor in said terminal range, said one of the first needle valves and said first ridge jointly divide an interior space of said casing into two chambers for effectively preventing the viscous fluid from moving between said chambers to produce the relatively large torque.

3. A damper device according to claim 2, wherein said first axial grooves each having a depth which varies from one end to an opposite end in the width direction of the first axial groove such that a shallowest portion is positioned at said one end of one of said first axial grooves and at said opposite end of the other of said first axial grooves.

4. A damper device according to claim 2, wherein said torque generating means and said fluid torque adjusting means are arranged in two sets.

5. A damper device according to claim 2, wherein said first ridge and said first circumuferential groove on the outer surface of said rotor and said first land on the inner surface of said casing are provided in pairs, said pair of first ridges being arranged in a diametrically opposite relation to each other, said pair of first circumuferential grooves being arranged in a diametrically opposite relation to each other and each between said first ridges, said pair of first lands being arranged in a diametrically opposite relation to each other, said pair of first axial grooves respectively receiving said pair of first needle valves therein being provided one on each of said pair of first lands.

6. A damper device according to claim 1, wherein said torque generating means has a second land extending axially on an inner surface of said casing and having a radially inner surface held in sliding contact with an outer surface of said rotor, and wherein said fluid torque adjusting means comprises a third land extending axially on said outer surface of said rotor, a pair of second axial grooves defined axially on a radially outer end of said third land on the rotor and spaced circumferentially from each other, a pair of second needle valves loosely fitted in said second axial grooves, respectively, for movement in the width direction of said second axial grooves, and a second circumuferential groove defined circumferentially in said inner surface of said casing, said second circumferential groove being positioned out of facing relation to at least one of said second needle valves in said terminal range of each of said rotating strokes, whereby when said at least one of the second needle valves is held against said inner surface of said casing in said terminal range, said one of the second needle valves and said second land of the casing jointly divide an interior space of said casing into two chambers for effectively preventing the viscous fluid from moving between said chambers to produce the relatively large torque.

7. A dapper device according to claim 6, wherein said second axial grooves each having a depth which varies from one end to an opposite end in the width direction of the second axial groove such that a shallowest portion is positioned at one end of one of said second axial grooves and at the opposite end of the other of said second axial grooves.

8. A damper device according to claim 6, wherein said torque generating means and said fluid torque adjusting means are arranged in two sets.

9. A damper device according to claim 6, wherein said second land and said second circumferential groove on the inner surface of said rotor and said third land on the outer surface of said casing are provided in pairs, said pair of second land being arranged in a diametrically opposite relation to each other, said pair of second circumferential grooves being arranged in a diametrically opposite relation to each other and each between said second land, said pair of third lands being arranged in a diametrically opposite relation to each other such that each of said third lands is positioned between said second lands, said pair of second axial grooves respectively receiving said pair of second needle valves therein being provided one on each of said pair of third lands.

10. A damper device according to claim 1, wherein said torque generating means has a fourth land extending axially on an inner surface of said casing and having a radially inner surface held in sliding contact with a outer surface of said rotor, and wherein said fluid torque adjusting means comprises a pair of second ridges extending axially on said outer surface of said rotor, a pair of valve bodies loosely mounted on said second ridges, respectively, and a third circumferential groove defined circumferentially in said inner surface of said casing, said third circumferential groove being positioned out of facing relation to at least one of said valve bodies in said terminal range of each of said rotating strokes, whereby when said at least one of the valve bodies is held against said inner surface of said casing in said terminal range, said one of the valve bodies and said second ridges jointly divide an interior space of said casing into two chambers for effectively preventing the viscous fluid from moving between said chambers to produce the relatively large torque.

11. A damper device according to claim 10, wherein one of said valve bodies having an orifice which opens when said rotor rotates in one direction and the other of said valve bodies having an orifice which opens when said rotor rotates in a direction opposite to said one direction.

12. A damper device according to claim 10, wherein said torque generating means and said fluid torque adjusting means are arranged in two sets.

13. A damper device according to claim 10, wherein said fourth land and said third circumferential groove on the inner surface of said casing are provided in pairs, said pair of fourth lands being arranged in a diametrically opposite relation to each other, said pair of third circumferential grooves being arranged in a diametrically opposite relation to each other and each between said fourth lands, and said pair of second ridges being arranged in a diametrically opposite relation to each other such that each of said second ridges is positioned between said fourth lands.

\* \* \* \* \*